US009965001B1

(12) United States Patent
Stetor et al.

(10) Patent No.: US 9,965,001 B1
(45) Date of Patent: *May 8, 2018

(54) MOUNTING ASSEMBLY FOR TOOL-LESS MOUNTING OF A CIRCUIT BOARD IN AN ENCLOSURE

(71) Applicant: Oracle International Corporation, Redwood City, CA (US)

(72) Inventors: Gabrielle Kariann Stetor, Sunnyvale, CA (US); Andres Gabriel Hofmann, Poway, CA (US); Eric Munro Innes, San Diego, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/431,356

(22) Filed: Feb. 13, 2017

(51) Int. Cl.
*A47B 81/00* (2006.01)
*G06F 1/18* (2006.01)

(52) U.S. Cl.
CPC .............. *G06F 1/183* (2013.01); *G06F 1/181* (2013.01)

(58) Field of Classification Search
CPC ........................................................ G06F 1/183
USPC .......................................... 312/223.1, 223.2
See application file for complete search history.

(56) References Cited

U.S. PATENT DOCUMENTS

| | | | | |
|---|---|---|---|---|
| 9,753,504 B2* | 9/2017 | Norton | ..................... | G06F 1/183 |
| 9,807,902 B2* | 10/2017 | Conn | .................... | H05K 7/1489 |
| 2014/0240908 A1* | 8/2014 | Kwon | ...................... | G06F 1/183 |
| | | | | 361/679.02 |
| 2014/0301030 A1* | 10/2014 | Tsai | ......................... | G06F 1/181 |
| | | | | 361/679.31 |
| 2014/0346298 A1* | 11/2014 | Tsai | ...................... | G11B 33/124 |
| | | | | 248/224.8 |
| 2014/0360916 A1* | 12/2014 | Dittus | ....................... | B65B 5/04 |
| | | | | 206/722 |
| 2016/0282912 A1* | 9/2016 | Liu | ......................... | G06F 1/183 |
| 2017/0300091 A1* | 10/2017 | Elwany | ................... | G06F 1/182 |
| 2017/0322603 A1* | 11/2017 | Cocchini | ................. | G06F 1/183 |
| 2017/0322605 A1* | 11/2017 | Potter | ..................... | G06F 1/187 |

* cited by examiner

*Primary Examiner* — Matthew W Ing
(74) *Attorney, Agent, or Firm* — Marsh Fischmann & Breyfogle LLP; Kent A. Lembke

(57) ABSTRACT

A computer enclosure with a mounting assembly for accurately positioning, attaching, and supporting a circuit board within an enclosure or module without tools or fasteners. The mounting assembly includes a number of components and features that act as low-cost, tool-less mechanisms for mounting and fastening a circuit board within an enclosure with accurate locating of the board for later mating with other boards and/or electrical connectors. The mounting assembly allows for a circuit board to be installed and securely mounted to an enclosure without hardware, fasteners, and tools. This is accomplished through components that were designed and engineered to provide accurate positioning of the board within the enclosure when the board is snapped into place with a single hand of the installer and without the use of tools for fastening the board in a predefined location within the enclosure.

20 Claims, 11 Drawing Sheets

MOUNTING ASSEMBLY FOR TOOL-LESS MOUNTING OF A CIRCUIT BOARD IN AN ENCLOSURE

BACKGROUND

1. Field of the Invention

The present description generally relates to assembly of servers and other computer equipment, telecommunications equipment, and electronics in standard enclosures or boxes (each of which may simply be called a "module" or "chassis" herein) that will then, often but not always, be mounted in a rack with other enclosures/boxes (i.e., each being a rack-mountable chassis). More particularly, the present description relates to a mounting assembly (or mounting and fastening assembly or apparatus) adapted for locating, supporting, and retaining or fastening a printed circuit board (PCB) or PCB with other electronic components in the form of a printed circuit assembly (PCA) (herein, both are referred to more simply as "boards" or "circuit boards"), with a typical arrangement being to mount the board horizontally within a module, such as a fan module, that is then inserted into a chassis between two vertical chassis sidewalls so as to provide electrical connection between the board's edge connector and a connector of a midplane board (or midplane PCA).

2. Relevant Background

There are numerous settings or environments where electronic equipment, computers and computer equipment (e.g., servers, routers, and so on), and telecommunications equipment are provided in a centralized location in standard or conventional racks. Often, this equipment is provided within a box or chassis that is then mounted within the rack. Such use of racks with configurable electronic or computer devices each in a chassis can be found in data centers, computer rooms, network rooms, control rooms, telecommunication centers, and so on.

As a specific example, servers and other computing devices are often each provided in such a chassis. During assembly of each of these devices, it is common for a PCB or PCA (or "board") to be mounted vertically in each with its ends extending between the vertical side walls of the chassis. Such a board is mounted between the rear and front ends of the chassis, and this PCA or simply "board" or "circuit board" may be a midplane board (or midplane PCA). Assembly of a server or other device in a chassis can be time consuming and tool-intensive work, and this is due, in part, to the need for very accurate alignment of the midplane board within the chassis to allow later installed components to mate with the midplane boarder.

More specifically, the midplane board has to be provided in a specific location (as measured with X, Y, and Z coordinates) so that its connectors can be effectively mated with connectors on the later installed components (such as a fan module, a data storage module, a power module, and so on). In most designs, a bulkhead, which is fabricated to be rigid and relatively heavy duty is provided in the chassis, with the bulkhead including a plurality of guide pins for receiving the midplane board. Assembly requires attachment of the midplane board to this bulkhead with a plurality of fasteners to achieve desired alignment and support of the midplane board. As with the midplane board, circuit boards that are provided in later installed components, such as a fan module, a power module, or other module, must also be retained within the module in a specific location (as measured with X, Y, and Z coordinates) so that it can be properly coupled or electrically connected (or mated) with the connectors on the midplane board.

Conventionally, circuit boards (e.g., PCAs) have been most commonly mounted into an enclosure, such as a fan or power module or the like, using hardware including screws, nuts, and other small fasteners. As a result, the process of assembling a module with a circuit board is often time consuming and expensive, and the assembly process is also subject to a large potential for human error. The following is a sampling of problems that have plagued module designs with boards attached by conventional fasteners: (a) under torqueing of threaded fasteners, which can lead to loose boards and/or metallic fasteners inside a "live" system; (b) over torqueing of threaded fasteners, which can lead to stripped nuts, screws, and stand-offs and/or can lead to crack initiation or propagation on circuit boards; (c) electric or pneumatic screwdrivers jumping or slipping off the screw head, which often results in damage to the board surface; and (d) expensive, time-consuming rework because when a defective board needs replacement either the entire module is discarded or an operator must manually remove all fasteners, replace the defective board, and then re-install all the fasteners to position and retain the replacement board.

Hence, there remains a need for a new design for enclosures including fan, power, and other modules that are inserted into a larger enclosure or chassis. The new design should facilitate more efficient installation and replacement of boards and should be less expensive to implement.

SUMMARY

Briefly, a fastening or mounting assembly is provided for accurately positioning, attaching, and supporting a circuit board (e.g., a PCB, a PCA, or the other board) within an enclosure, such as a module (e.g., fan or power module) for later insertion in a server or other chassis. The mounting assembly includes a number of components and features that act as low-cost, tool-less mechanisms for mounting and fastening a circuit board within an enclosure with accurate locating of the board for later mating with other boards and/or electrical connectors. The mounting assembly allows for a PCB to be installed and securely mounted to an enclosure without hardware, screws/fasteners, and tools. This is accomplished through a set of components/features that were specifically designed and engineered to provide accurate positioning of the board within the enclosure (e.g., with its edge or other connector at a particular location with regard to X, Y, and Z coordinates) when the board is snapped into place with a single hand of the installer and without the use of tools for fastening it in the positionally-aligned location within the enclosure.

More particularly, a computer enclosure is provided that is adapted for tool-less installation of a circuit board with accurate locating of the board and its connectors. The enclosure (e.g., a power or fan module) includes: a base; a first sidewall extending outward from an upper surface of the base; and a second sidewall extending outward from the upper surface of the base and spaced apart from and parallel to the first sidewall. The inner surfaces of the first and second sidewall with the upper surface of the base define or enclose an interior space of the computer enclosure. The enclosure includes a forward locating member, a rear locating member, and first and second side retention members.

The forward locating member includes a body extending into the interior space from the upper surface of the base, and the forward locating member includes a guide slot in the body facing the interior space with a lower receiving surface parallel to the upper surface of the base and a forward stop surface. When a leading edge of a circuit board is inserted into the guide slot, the leading edge of the circuit board abuts the forward stop surface to define a location of the leading edge relative to a longitudinal axis of the computer enclosure and a bottom surface of the circuit board abuts the lower receiving surface to support the circuit board a predefined height above the upper surface of the base. The rear locating member is spaced apart from the forward locating member and includes a body extending into the interior space form the upper surface of the base, and the rear locating member includes a tab extending from the body and separating a pair of shoulder surfaces on the body. When the circuit board is installed in the computer enclosure, the tab extends through a hole in the circuit board defining a location of the circuit board relative to the inner surfaces of the first and second sidewalls and limiting side-to-side movement of the circuit board relative to the first and second sidewalls. Further, when the circuit board is installed in the computer enclosure, the bottom surface of the circuit board abuts the shoulder surfaces to support the circuit board at the predefined height above the upper surface of the base.

The first and second side retention members are provided on the inner surfaces of the first and second sidewalls, respectfully. Each of the first and second side retention members includes a head assembly supported on a lever arm, and the head assembly includes a body with an at-rest position an overhang distance from the inner surface of the sidewall and an offset position proximate to the inner surface of the sidewall. During insertion of the circuit board, the body of the head assembly is moved from the at-rest position to the offset position to position the bottom surface of the circuit board on the shoulders of the body of the rear locating member. After positioning of the circuit board on the rear locating member, the body of the head assembly springs back to the at-rest position with a contact surface of the body of the head assembly extending over an upper surface of the circuit board.

In some embodiments, the head assembly of each of the first and second side retention members further includes an upper guide tab extending outward from a side of the body opposite the base, and the upper guide tab is angled away from the body toward the inner surface of the sidewall at an angle in the range of 30 to 60 degrees. In some cases, the overhang distance is at least 3 millimeters.

In the same or other embodiments, the guide slot in the forward locating member includes an upper retention surface extending from the forward stop surface and a guide surface extending from the upper retention surface to an opening of the guide slot. The upper retention surface, when the circuit board is positioned with the lead edge in the guide slot, limits movement of the circuit board in a direction away from the base, and the guide surface is angled away from the lower receiving surface at an angle of at least 30 degrees.

The computer enclosure may include an additional forward locating member spaced apart from the forward locating member. The additional forward locating member includes a body extending into the interior space from the upper surface of the base, and the additional forward locating member includes a guide slot in the body facing the interior space with a lower receiving surface parallel to the upper surface of the base and a forward stop surface. When the leading edge of a circuit board is inserted into the guide slot, the leading edge of the circuit board abuts the forward stop surface to define the location of the leading edge relative to the longitudinal axis of the computer enclosure and the bottom surface of the circuit board abuts the lower receiving surface to support the circuit board at the predefined height above the upper surface of the base.

In some embodiments, the computer enclosure includes an additional rear locating member spaced apart from the rear locating member and including a body extending into the interior space form the upper surface of the base. The additional rear locating member includes a tab extending from the body and separating a pair of shoulder surfaces on the body. When the circuit board is installed in the computer enclosure, the tab extends through an additional hole in the circuit board defining a location of the circuit board relative the longitudinal axis of the computer enclosure and limiting movement of the circuit board relative to the longitudinal axis of the computer enclosure. When the circuit board is installed in the computer enclosure, the bottom surface of the circuit board abuts the shoulder surfaces to support the circuit board at the predefined height above the upper surface of the base.

In some cases, the base and the first and second sidewalls are fabricated of sheet metal, and the front and rear locating members are integrally formed with the base. The first and second side retention members are integrally formed from the first and second sidewalls, respectfully, with an end of the lever arm joined to a corresponding one of the first and second sidewalls.

DETAILED DESCRIPTION

Figure 1:
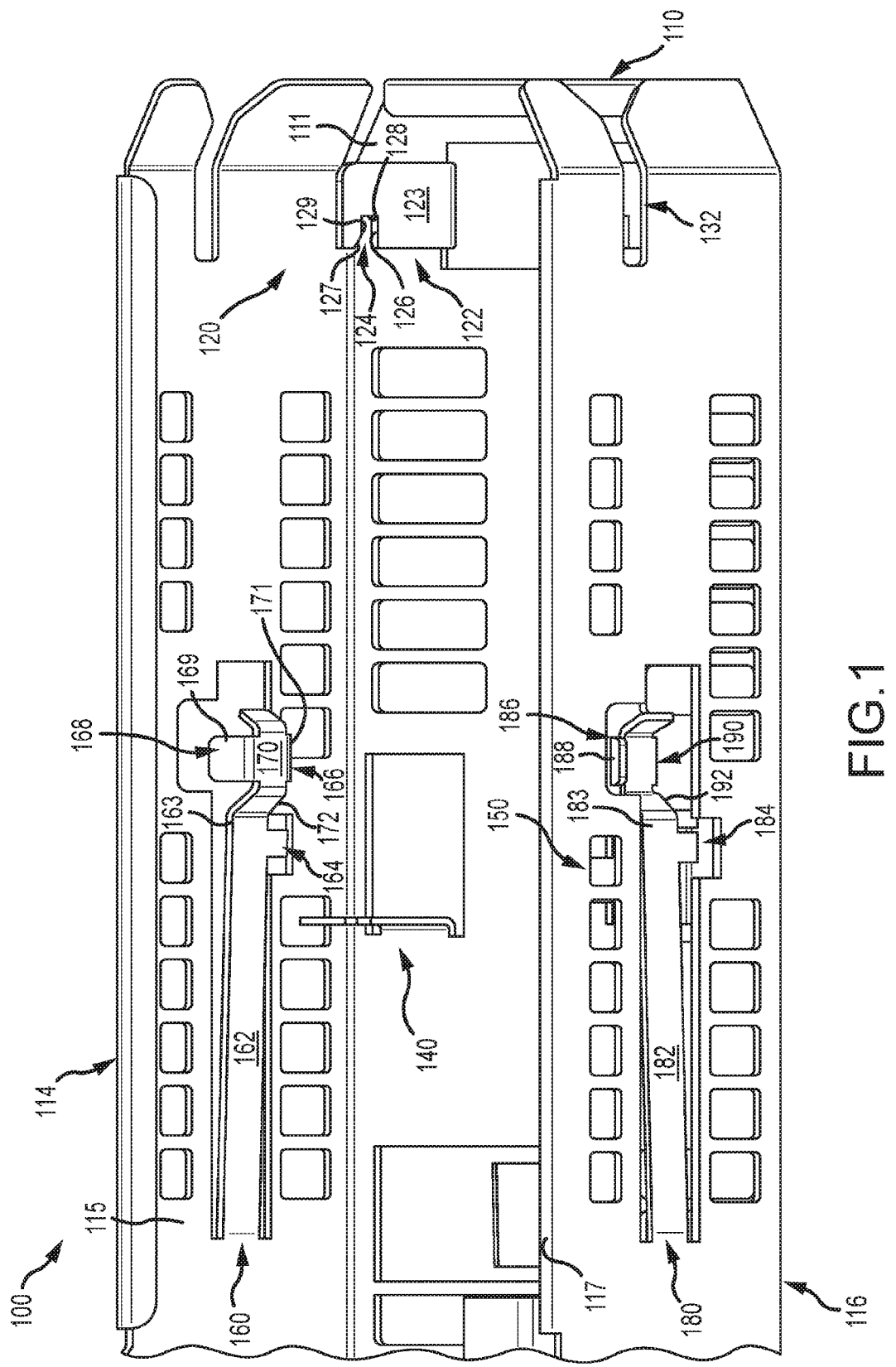
FIG. 1 illustrates a top perspective view of an enclosure (such as may be used for a module such as a fan or power module) with a mounting assembly of the present description and prior to insertion of a circuit board (such as a PCB, PCA, or the like)

The present description is directed toward an assembly for mounting (or fastening) circuit boards (such as a PCB or a PCA) within an enclosure, which may take a wide variety of forms including a fan, power, or other module configured for insertion into another enclosure (e.g., a computer or rack-mountable chassis or the like). The description is also directed toward the enclosures, with or without a circuit board, that include the mounting assembly. In brief, the mounting assembly includes a set of locating and supporting members (or stand-off elements) extending outward from a base of the enclosure (or module) that in combination act to guide initial insertion of a circuit board as well as to provide accurate locating of the circuit board in a horizontal plane (e.g., parallel to the base of the enclosure) and relative to the X-axis, the Y-axis, and the Z-axis (e.g., with an edge connector having predefined X, Y, and Z coordinates relative to the walls (or other features) of the enclosure).

The mounting assembly may be considered to further include a pair of alignment holes extending through the circuit board for receiving protruding tabs or posts of a rear pair of the locating and supporting members (or stand-off elements) to provide locating of the board within the enclosure relative to the X and Z axes. Further, the mounting assembly includes one, two, or more retention members configured as snap-fit mechanisms. Each of the retention members, which are typically located on a sidewall of the enclosure, is configured to be pushed (e.g., elastically deformed) from a first or at-rest position to a second or offset position to allow insertion of the board into the interior space of the enclosure with a lower surface of the board abutting or engaging the locating members. Once the board clears a contacting surface on the retention member, the retention member is configured to spring or snap back from the second or offset position back into the first or at-rest position, which places the head of the retention member over the board with a contact surface or side abutting (or being proximate to) the upper surface of the board so as to fasten the board in place with its lower surface abutting or resting upon receiving surfaces or shoulders of the locating members.

The features of the mounting assembly enable an enclosure with the mounting assembly to be used, without tools, to assemble, support, and retain the board within the enclosures interior space. The mounting assembly's features are designed to allow the board to be snapped into place with minimal force. The locating members (or stand-off elements) support the board so as to be spaced apart a distance from the enclosure's base. In other words, the board is raised, which increases airflow over its lower and upper sides and allows for components to later be placed on both sides of the board. The mounting assembly and its unique features can be applied to an infinite number of board and enclosure geometries. The mounting assembly allows for an easy, smooth, and fast assembly for PCB and other boards within an enclosure and acts to mount the board securely within the enclosure. The mounting assembly eliminates all extraneous expenses for fastening hardware and any cost for additional tools as well as the manual labor to install boards into mechanical enclosures. The minimal manual labor and hardware associated with use of the new mounting assembly decreases the cost of the enclosure. The mounting assembly design also eliminates human error potential as the mounting assembly is configured to only allow the board to fit into the enclosure with one orientation including without being flipped as the board will not fit within the mounting assembly with the bottom of the board facing upward.

Figure 2:
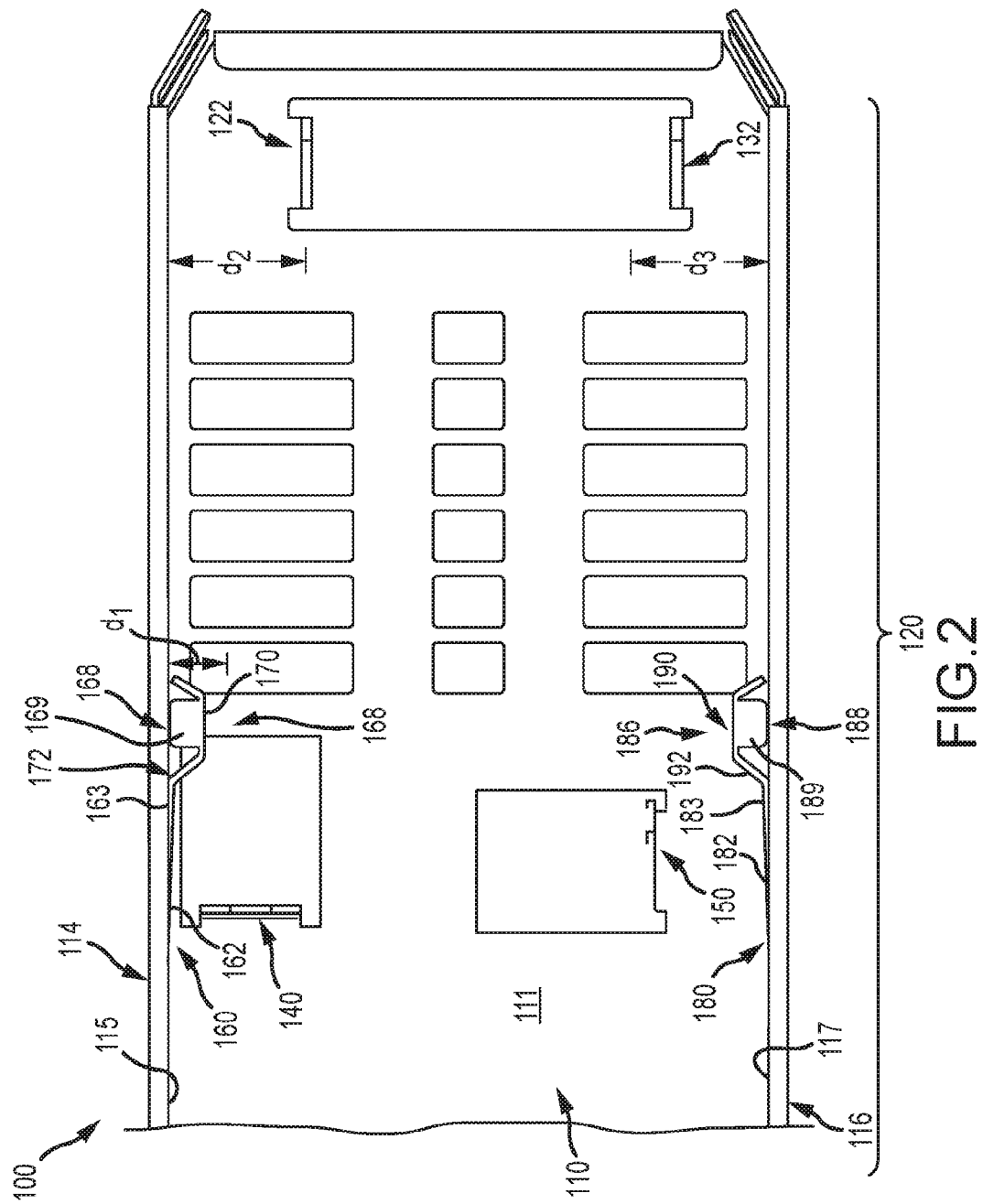
FIG. 2 illustrates a top view of the enclosure of FIG. 1.

FIGS. 1 and 2 illustrate a top perspective view and a top view, respectfully, of an enclosure 100, such as may be used as a module such as a fan or power module to be inserted into a server or other chassis. The enclosure 100 includes a mounting assembly 120 of the present description, and FIGS. 1 and 2 illustrate the enclosure 100 prior to insertion of a circuit board (such as a PCB, PCA, or the like) into the mounting assembly 120.

As shown, the enclosure 100 includes a base 110 with its upper surface 111 defining one side (lower side) of the interior space of the enclosure 100. The enclosure further includes a pair of sidewalls 114 and 116 (which may be referred to as left and right sidewalls or first and second sidewalls). The sidewalls 114, 116 extend upward orthogonally from opposite edges of the base 110 such that their inner surfaces 115, 117 in combination with the upper base surface 111 define the interior space of the enclosure 100, and this interior space is used to receive, support, and locate one or more electronics and/or computer components including at least one circuit board. The enclosure's base 110 and sidewalls 114, 116 may be fabricated from sheet metal in many applications, but other materials may be utilized. The use of sheet metal for the base 110 and sidewalls 114, 116 is useful in some cases as the components of the mounting assembly 120 can be formed by cutting or punching followed by one or more bending operations.

The mounting assembly 120 includes a set of locating members that function to guide insertion of a board into the interior space of the enclosure 100 as well to support the board after insertion and, significantly, to locate the board relative to X, Y, and Z axes (or with proper X, Y, and Z coordinates in the enclosure 100). To this end, the set of locating members includes a forward pair of forward locating members 122 and 132 (or first and second forward locating members or left and right forward locating members) and further includes a pair of rearward locating members 140 and 150. As will become clearer with reference to figures showing insertion of a circuit board, each of the locating members 122, 132, 140, 150 provides a specific function in the mounting assembly 120 and several of these functions or features of the locating members 122, 132, 140, 150 work in concert to provide specific locating and retention of a circuit board.

The two forward locating members 122, 132 have matching configurations and are each fabricated by a punching operation followed by a bending operation to orient the locating members 122, 132 at about 90 degrees (or to be orthogonal) to the upper surface 111 of the enclosure base 110. The locating members 122, 132 each includes a planar body (as shown in FIGS. 1 and 2 with reference to member 122 and its body 123), and the bodies are spaced apart a distance from each other and are parallel to each other and to a longitudinal axis of the enclosure 100 (and to the inner surfaces 115, 117 of the sidewalls 114, 116). The forward locating members 122, 132 are typically the first components of the mounting assembly 120 to contact or engage a received/inserted circuit board, and, with reference first to member 122, the body 123 of the locating member 122 is shown to include a guide slot 124 toward its upper end.

The guide slot 124 is used to initially engage a leading/front edge of a circuit board upon its insertion into the enclosure 100, and the guide slot 124 is defined by a lower support surface 126, an upper guide surface 127, a forward stop or contact surface 128, and an upper retention surface 129. The forward stop or contact surface 128 defines the depth of the slot 124 (e.g., 2 to 6 millimeters (mms) or the like) and the maximum forward travel of the leading edge of an inserted board, and, in this manner, the forward stop surface 128 acts to, at least in part, locate the board's leading or front edge within the enclosure along the Z-axis (or along the longitudinal axis of the enclosure 100). The lower support surface 126 acts to provide vertical support of an inserted board, with the board's lower surface contacting the lower support surface 126. The lower support surface 126 typically is a horizontal surface that is parallel to the upper surface 111 of the base 110 of the enclosure 100 when it is desired to retain a received circuit board to be parallel to the surface 111. The height of the lower support surface 126 acts to locate the front edge of the board vertically or relative to the Y-axis, with at least some separation between the lower support surface 126 (and a lower surface of a received board) and the upper surface 111 of the base 110 typically being desirable to provide air flow over the board and to also provide access to the lower surface of the board (e.g., for connections of components to the board). The upper retention surface 129 generally acts to prevent the mounted board (or its front/leading edge) from lifting up or moving up (moving along the Y-axis) once it is fully received in the mounting assembly 120.

The upper guide surface 127 is provided at an upper leading edge of the guide slot 124 and is used to allow the board to be inserted downward at an angle (from horizontal) and to guide or urge the board into the slot 124. As will be seen below with reference to later figures, an upper surface of the board's leading edge typically will be positioned so as to abut or engage the surface 127, and its downward angle (30 to 60 degrees or the like with an angle of about 45 degrees being shown in FIG. 1) is chosen to guide the board into the slot 124. The angle or slope of the surface 127 is chosen to geometrically suit the location of side retention members 160, 180 as the lower surface of an inserted board has to initially clear these members 160, 180 as the leading edge of the board is positioned into the slot 124 (e.g., the closer the retention members 160, 180 are to the forward locating members 122, 132 the steeper the angle/slope needs to be to allow insertion).

Note, the mounting assembly 120 is adapted also to prevent a circuit board from being inserted upside down or with its upper surface facing the upper surface 111 of the base 110 of the enclosure 100. In general, this is achieved by designing the set of locating members to not be symmetric (or to be asymmetric). This feature is provided in part by the positioning of the forward locating members 122, 132 relative to the sidewalls 114, 116. Specifically, as shown in FIG. 2, the left forward locating member 122 is located a distance, $d_2$, from the inner surface 115 of the left sidewall 114 while the right forward locating member 132 is located a distance, $d_3$, from the inner surface 117 of the right sidewall 116. These are not equal with the distance, $d_2$, being greater than the distance, $d_3$, and the leading edge of the circuit board is designed with a pattern suited to these locations of the locating members 122, 132 such as with a location of a protruding surface or edge connector that only fits between the locating members 122, 132 when the board has its correct side facing upward (or downward) and not when it is "flipped."

The set of locating members also includes first and second (or left and right) rear locating members 140 and 150. These two locating members 140 and 150 do not contact an inserted board until after it has been pushed downward over the side retention members/elements 160, 180 and serve different purposes than the forward locating members 122, 132. The particular features of the rear locating members 140, 150 will be discussed below with reference to FIGS. 3 and 4. For now, though, it is useful to understand that the first/left rear locating member 140 is configured to locate a received or mounted board in the side-to-side direction or along the X-axis. The locating member 140 also is configured to provide vertical support of the board in the enclosure (near the board's trailing or rear edge) and, in this regard, the locating member 140 provides this support (with the support surfaces of the forward locating members 122, 132) to retain the board in a position and/or orientation that is parallel to the upper surface 111 of the base 110 (and a predefined distance from this surface 111) to provide location of the board relative to the Y-axis. The second/right rear locating member 150 is configured to locate the board in the front-to-back direction or along the Z-axis. The locating member 150 is also configured, similar to member 140, to provide vertical support of the board in the enclosure 100 (again, near the board's trailing or rear edge) and, in this regard, the locating member 150 provides vertical support so as to retain the board in a position and/or orientation that is parallel to the upper surface 111 of the base 110 (i.e., to provide location of the board relative to the Y-axis in the enclosure 100).

To facilitate tool-less fastening of a board in the enclosure 100, the mounting assembly 120 includes left and right (or first and second) side retention members/elements 160, 180. In brief, each of the retention members 160, 180 is configured to be a spring or snap mechanism that can be manually moved (elastically deformed) from an at-rest position (shown in FIGS. 1 and 2) to an offset position outside the interior space of the enclosure 100 (or at least level with the inner surfaces 115, 117 of the walls 114, 116) such that a board, which is engaging the slots of the forward locating members 122, 132 at its leading or forward edge, can be manually pushed downward toward the base's upper surface 111 to engage the rear locating members 140, 150. Once the dislocated or offset side retention members 160, 180 are cleared by the upper surface of the board, the side retention members 160, 180 spring or snap back into their at-rest positions, with at least a portion of each of the retention members 160, 180 extending a distance (or overhang distance), $d_1$, over the upper surface of the board so as to retain it in position by limiting its upward movement (or from lifting off the locating members 122, 132, 140, and 150).

To provide this retention function, each of the retention members 160, 180 includes a strut or lever arm 162, 182 extending from a first end attached to the sidewall 114, 116 to a second or cantilevered end 163, 183 (such as with an arm length of 20 to 60 mm or the like). The arms 162, 182 have a shape (width and length and so on) chosen so that the arms 162, 182 are elastically deformed when moved from the at-rest position to the offset position and not plastically deformed, and the shape of the arms 162, 182 will be chosen to suit the material and thickness of the walls 114, 116 used to form the arms 162, 182.

Near the outer ends 163, 183, the side retention members 160, 180 each includes a lower post or tab 164, 184 extending downward (toward the upper surface 111 of the base 110) from the arms 162, 182 a predefined distance (such as 2 to 6 mm), and the lower posts/tabs act to engage and/or abut opposite sides/edges of a received board to apply a spring or side retention force (a force generally in a direction orthogonal to the inner surfaces 115, 117 of the sidewalls 114, 116) against the board to retain it in its location relative to the X-axis (i.e., limit or eliminate side-to-side movement of mounted board).

Each of the side retention members 160, 180 further includes a head assembly 166, 186, which is coupled to the outward end 163, 183 of the arm 162, 182. The head assembly 166, 186 is configured to allow snap in insertion of a board and then to lock the board in place by limiting vertical movement (i.e., movement away from the upper surface 111 of the base 110 or lifting off of the locating members 122, 132, 140, 150). Each of the head assemblies 166 and 186 includes a body 170, 190 and a positioning strut 172, 192 that extends outward at an angle from the outer end 163, 183 to support the body 170, 190 at an overhang distance, $d_1$, from the inner surface 115, 117 of the sidewall 114, 116. The body 170, 190 may be rectangular in shape as shown or take another shape, and the body 170, 190 includes a lower contact edge/surface 171, 191 that mates with an upper surface of a received/mounted board to limit its vertical movement or its movement off of the locating members 122, 132, 140, 150. The overhang distance, $d_1$, may be chosen to account for possible vibration of the enclosure 100 and may be in the range of 2 to 6 mm or more, and the bodies 170, 190 may be oriented generally parallel to the inner surfaces 115, 117 of the sidewalls 114, 116.

Further, each of the head assemblies 160, 180 includes an upper guide tab 168, 188 that functions to make initial contact with a lower surface of a board for the head assembly 160, 180 during insertion. The guide tab 168, 188 is attached to the body 170, 190 (along an upper edge or side of the body 170, 190) and extends outward from the body 170, 190 at an angle or slant toward the inner surface 115, 117 of the nearby sidewall 114, 116. The angle/slant may be 20 to 60 degrees as measured from vertical (a plane orthogonal to the upper surface 111 of the base 110 and extending along the longitudinal axis of the enclosure) to the contact/upper surface or side 169, 189, with an angle of about 30 to 45 degrees used in some embodiments. The angle of the guide tab 168, 188 and its length are chosen to both guide a board contacting the surface/side 169, 189 downward into the interior space of the enclosure 100 and also to direct the head's body 170, 190 to move from the at-rest position to an offset position allowing the board's sides/edges to pass by the head assembly 166, 186 (e.g., to cause the head body 170, 190 to move the offset distance, $d_1$).

Figure 3:
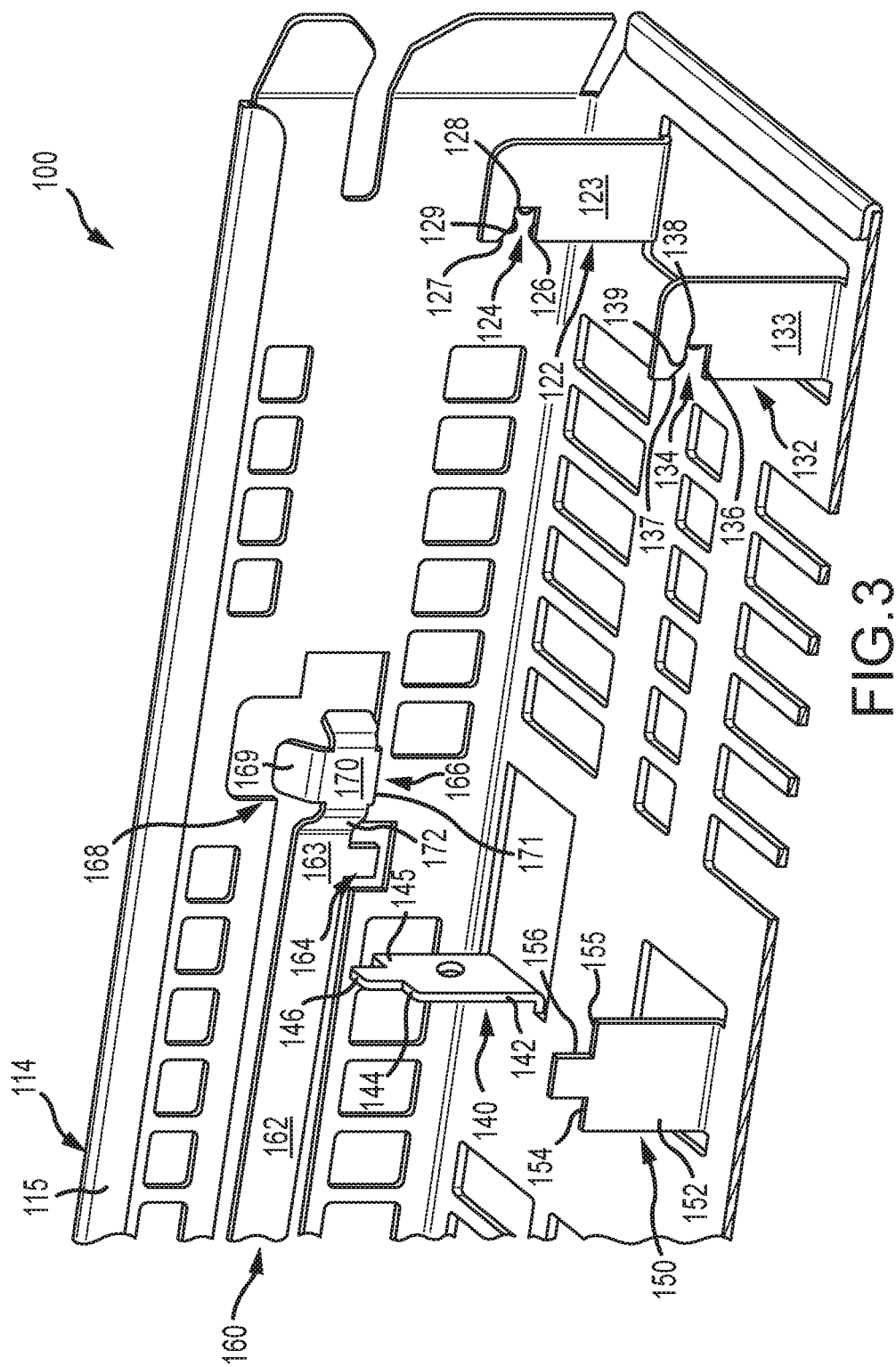
FIG. 3 illustrates a top perspective view of the enclosure of FIGS. 1 and 2 but with the right sidewall removed to show additional details of the mounting assembly in the interior space of the enclosure.
Figure 4:
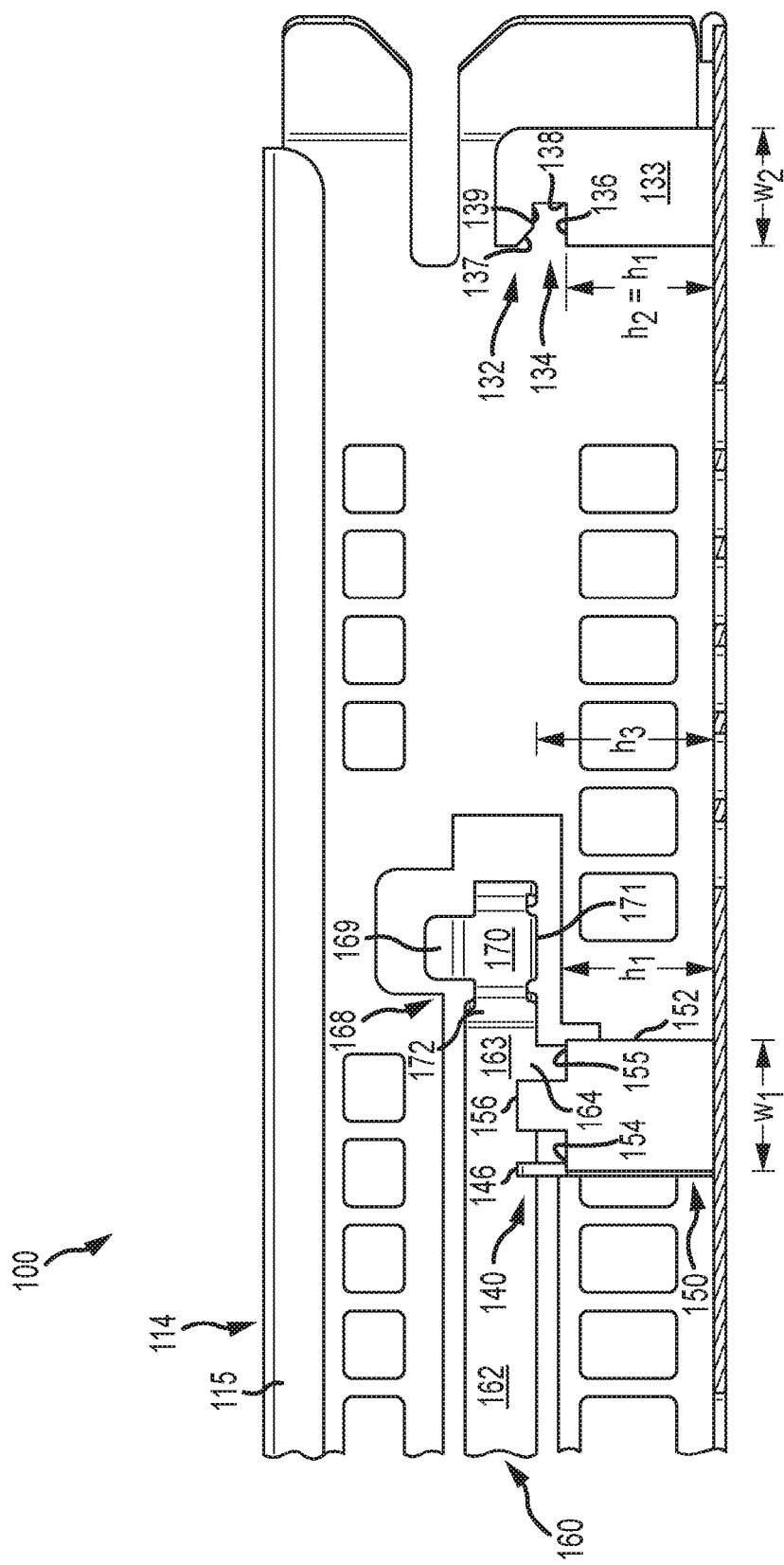
FIG. 4 illustrates a side view of the enclosure of FIG. 3.

FIGS. 3 and 4 provide further details of the mounting assembly 120 with a top perspective view and a side view of the enclosure 100 with the right sidewall 116 removed. As shown, the right forward locating member 132 has a design matching that of the left forward locating member 122. Specifically, the member 132 includes a planar body 133 extending orthogonally upward from the upper surface 111 of the base 110. A guide slot 134 is formed in the side of the body 133 facing toward the rear of the enclosure 100 (or toward the rear locating members 140, 150), with the guide slot 134 being configured to receive a leading or front edge of a circuit board during its mounting in the enclosure 100. The guide slot 134 is defined, as was the case for the slot 124, by a lower support surface 136, an upper guide surface 137, a forward stop or contact surface 138, and an upper retention surface 139, with each of these features/components providing similar functions as for like features/components of the locating member 122.

As shown in FIG. 4, the bottom of the slot 134 (and slot 124) as measured from the upper surface 111 of the base 110 to the lower support surface 136 (and surface 126) is at a height, $h_2$, that spaces a received board a desired distance above the base 110 (e.g., for air flow and access), and the height, $h_2$, is the same for both locating members 122, 132 to vertically locate (i.e., relative to a Y-axis of the enclosure 100) the lower surface of the board (near its leading edge). The forward locating members 122, 132 are preferably structurally stiff and rigid to be able to withstand relatively large forces upon initial insertion of the board by a technician. To this end, the bodies 123, 133 are oriented to be parallel to the longitudinal axis of the enclosure 100 and also to have a large enough width, w2, to avoid plastic deformation (such as a width of 5 to 10 mm or more) during insertion of a board into the mounting assembly 120.

As discussed above, the rear locating members or standoff elements 140, 150 are configured to provide locating functions and also to provide support for a received board. Particularly, the left rear locating member 140 is configured to provide locating of a received circuit board relative to the X-axis (or side-to-side positioning) within the interior space of the enclosure 100 and also to provide locating of the board relative to the Y-axis (or up-and-down positioning). To these two ends, the locating member 140 includes a planar body 142 extending orthogonally into the interior space from the upper surface 111 of the enclosure base 110. In contrast to locating members 122, 132, though, the body 142 is oriented to be orthogonal, rather than parallel, to the sidewall surfaces 115, 117. An X-axis locating tab or post 146 extends outward from an outer edge/end of the body 142, and the orienting of the body 142 and tab/post 146 allows it to define an X-axis location of a received board and limit the board's travel along the X-axis (e.g., by having the post/tab 146 extend through an elliptical hole in the circuit board provided specifically for X-axis locating during its assembly in the enclosure 100). The tab/post 146 does not extend the entire width (which may be equal to width, $w_1$, of the body 152) so that the locating member 140 includes a pair of support surfaces or shoulders 144, 145 on opposite sides of the post/tab 146. When a board is positioned into the mounting assembly 120, the shoulders 144, 145 abut the bottom or lower surface of the board to provide it with vertical support and to provide location of its bottom surface relative to the upper surface 111 of the base 110 (in combination with lower receiving surfaces 126, 136 of slots 124, 134 in the forward locating members 122, 132), and the shoulders 144, 145 are provided at a height, $h_1$, that matches the height, $h_2$, of the surfaces 125, 136 as well as the heights of the shoulders 154, 155 of the right rear locating member 150.

The right rear locating member 150 is configured to provide locating of a received circuit board relative to the Z-axis (or front-to-back positioning) within the interior space of the enclosure 100 and also to provide locating of the board relative to the Y-axis (or up-and-down positioning). To these two ends, the locating member 150 includes a planar body 152 extending orthogonally into the interior space from the upper surface 111 of the enclosure base 110. In contrast to locating member 140, though, the body 152 is oriented to be parallel, rather than orthogonal, to the sidewall surfaces 115, 117. A Z-axis locating tab or post 156 extends outward from an outer edge/end of the body 152, and the orienting of the body 152 and tab/post 156 allows it to define a Z-axis location of a received board and limit the board's travel along the Z-axis (e.g., by having the post/tab 156 extend through an elliptical hole in the circuit board provided specifically for Z-axis locating during its assembly in the enclosure 100). The tab/post 156 does not extend the entire width, $w_1$, so that the locating member 150 includes a pair of support surfaces or shoulder 154, 155 on opposite sides of the post/tab 156. When a board is positioned into the mounting assembly 120, the shoulders 154, 155 abut the bottom or lower surface of the board to provide it with vertical support and to provide location of its bottom surface relative to the upper surface 111 of the base 110 (in combination with lower receiving surfaces 126, 136 of slots 124, 134 in the forward locating members 122, 132), and the shoulders 154, 155 are provided at a height, $h_1$, that matches the height, $h_2$, of the surfaces 125, 136.

FIG. 4 also is useful for illustrating retention features of the side retention members 160, 180. As shown, the contact surface/edge 171 of the body 170 of the head assembly 166 is shown to be at a height, $h_3$, as measured from the upper surface 111 of the enclosure base 110. This height, $h_3$, is chosen to be greater than the heights, $h_1$ and $h_2$, of the support surfaces 126, 136, 144, 145, 154, 155 by about the thickness of a circuit board (or a small amount larger to account for manufacturing tolerances for the mounting assembly components as well as for the circuit board). In this way, the retention/contact surface 171 acts to press down on the board to force it into contact with the support surfaces 126, 136, 144, 145, 154, 155 so as to locate it in the enclosure 100 relative to the Y-axis or to at least retain it an acceptable distance from such surfaces (limited amount of lift off may be acceptable in some cases).

Figure 5:
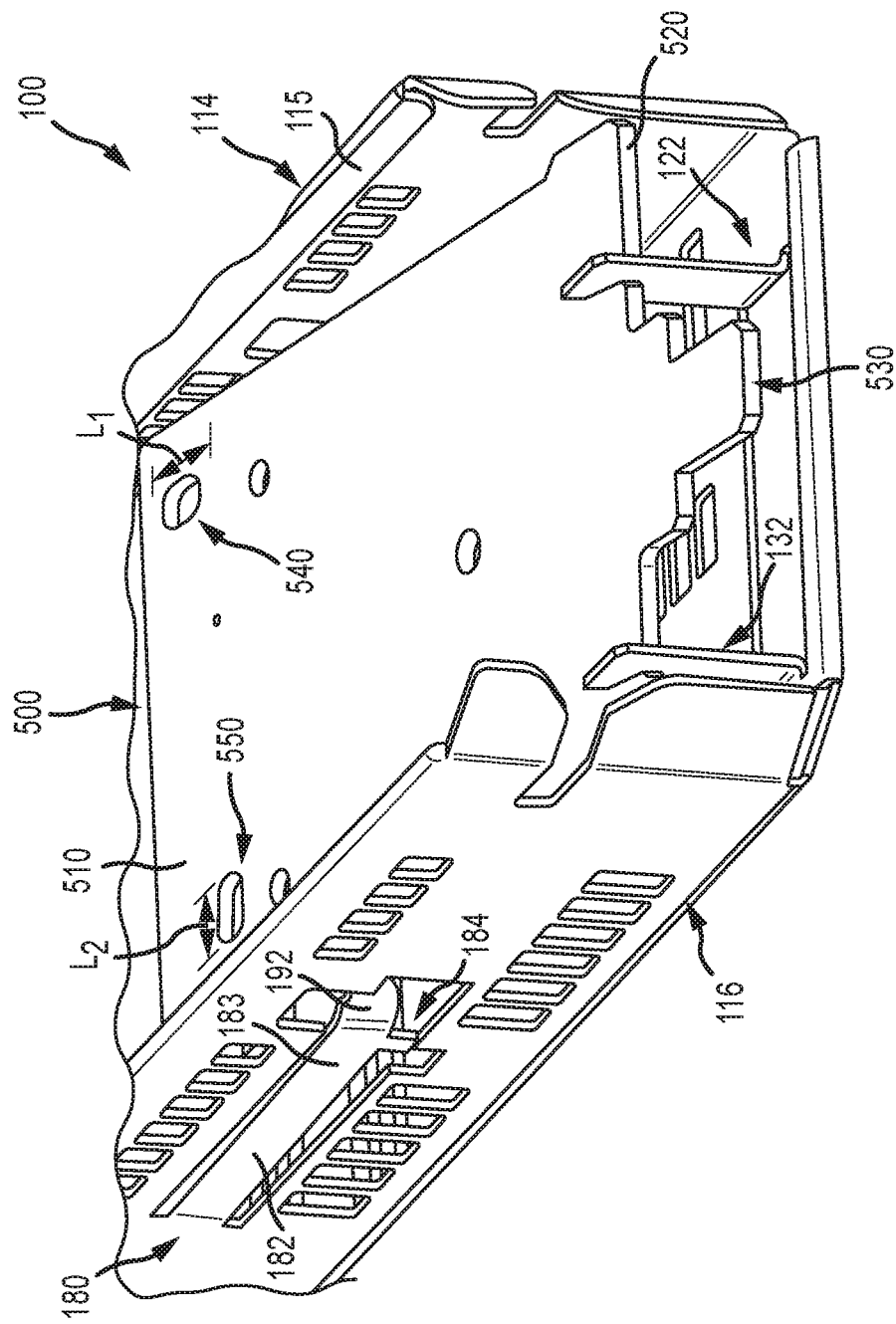
FIG. 5 is a top perspective view of an end of the enclosure of FIGS. 1-4 during an initial installation step for a circuit board using the mounting assembly of the present description.

With this understanding of the features of the mounting assembly 120 that are provided on the enclosure 100 understood, it may be useful to further explain the features of the mounting assembly 120 by describing insertion of a circuit board (such as a PCA or the like) into the enclosure 100 so as to properly locate the circuit board and also to fasten it in place without tools or fasteners. Manual and tool-less mounting of a circuit board 500 is shown in FIGS. 5-11. As shown in FIG. 5, the board 500 has a thin planar body that has an upper surface 510 and a bottom or lower surface 511 and a leading edge or side 520. An edge connector 530 is shown to extend outward from the leading edge 520. The locating of the board 500 provided by the mounting assembly 120 is such that the connector 530, once the board 500 is fully mounted/fastened in the enclosure 100, is in a desired location relative to other components of the enclosure 100 (e.g., with desired X, Y, and Z coordinates such as for connection with another board (e.g., a midplane board) when the module/enclosure 100 is inserted into another enclosure (such as a server chassis).

The board 500 is further shown to include a pair of locating or positioning holes 540, 550 that extend through the body of the board 500. Particularly, the hole 540 is provided for locating the board 500 relative to the X-axis via mating with the post/tab 146 of the left rear locating member 140, and the hole 540 has a length, $L_1$, that is greater than the width of the post/tab 146 by a predefined amount (e.g., a small amount to account for tolerances while still providing accurate X-axis locating of the board 500). Similarly, the hole 550 is provided for locating the board 500 relative to the Z-axis via mating with the post/tab 156 of the right rear locating member 150, and the hole 550 has a length, $L_2$, that is greater than the width of the post/tab 156 by a predefined amount (e.g., a small amount to account for tolerances while still providing accurate Z-axis locating of the board 500).

Figure 6:
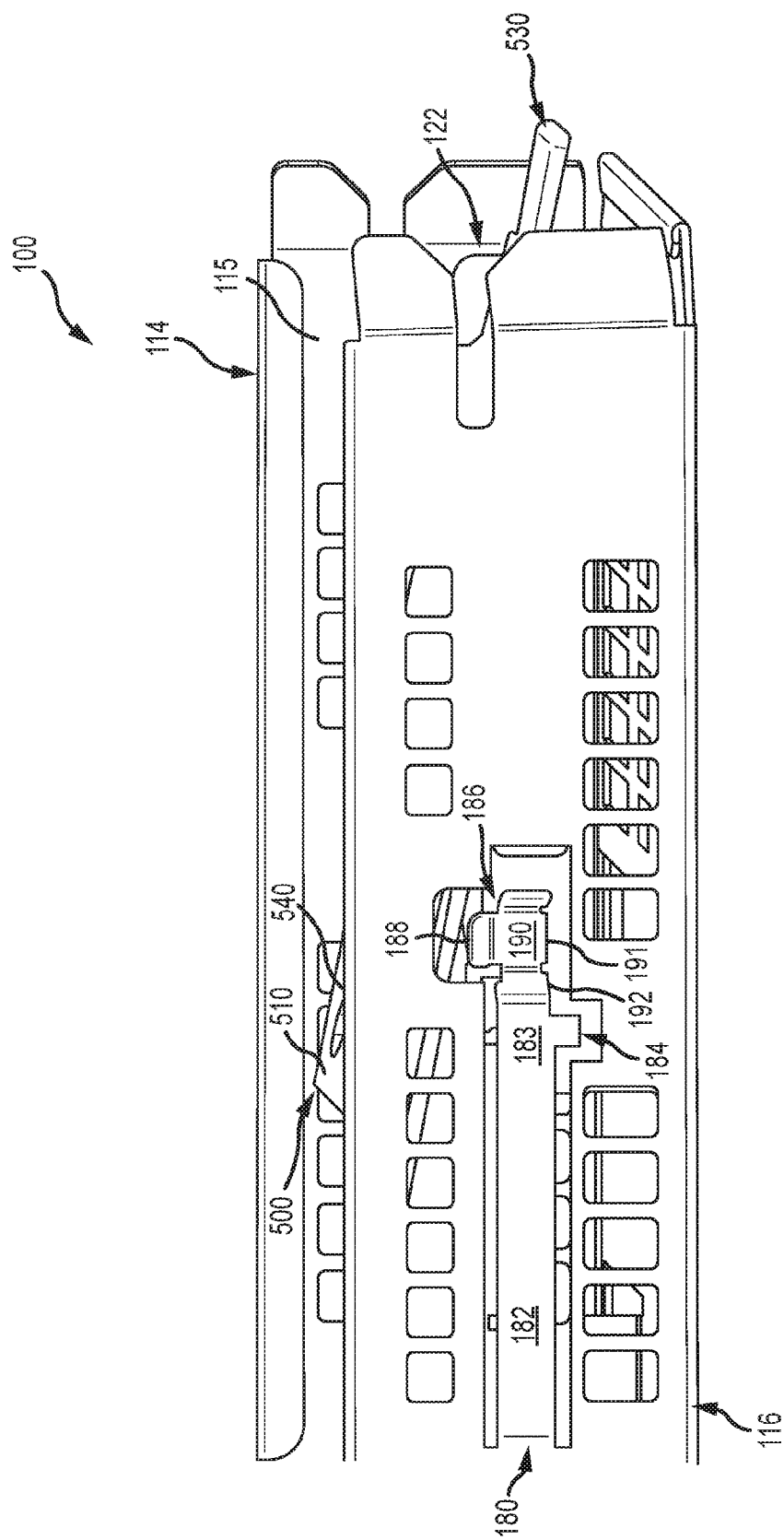
FIG. 6 is a side perspective view of the enclosure of FIG. 5.
Figure 7:
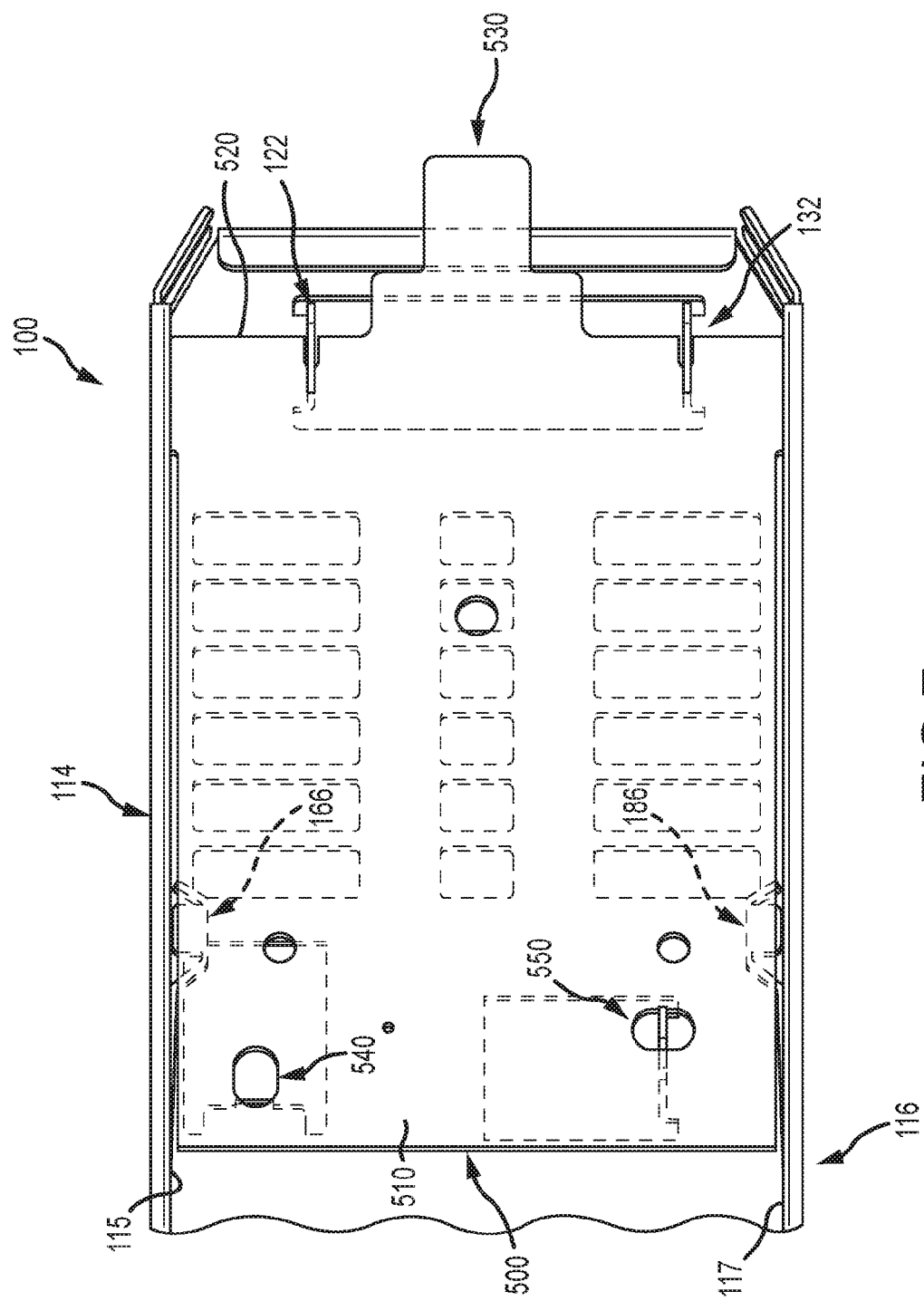
FIG. 7 is a top view of the enclosure of FIGS. 5 and 6.

In FIGS. 5-7, the board 500 is shown in an initial step of being mounted into the enclosure 100 such as with a technician's hand without tools. The board 500 is tilted at an angle such that its bottom surface 511 is above and, in some cases, contacting and sliding over the upper guide tab/element of the two side retention members 160, 180. The board 500 is slid into the enclosure's interior space until the leading edge 520 is within the interior space between the sidewalls 114, 116 and, more importantly, the leading edge 520 contacts the upper guides surfaces 127, 137 to cause the leading edge 520 of the board 500 to be guided into the slots 124, 134 of the front locating members 122, 132 of the mounting assembly 120. This provides initial or a "rough" side-to-side alignment (or locating along the X-axis) and also initial vertical alignment for the leading edge 520 of the board 500 (or locating relative to the Y-axis).

FIG. 7 illustrates, with the board 500 shown to be transparent, that the board 500 is received in the slots 124, 134 of the front locating members 122, 132. The sides/edges of the board 500 are positioned within the interior space between the enclosure sidewalls 114, 116, with a small gap between the edges/sides of the board 500 and the sidewall inner surfaces 115, 117. The board 500 is shown to be positioned over (and to even be resting upon) the head assemblies 166, 186 of the side retention members/elements 160, 180.

Figure 8:
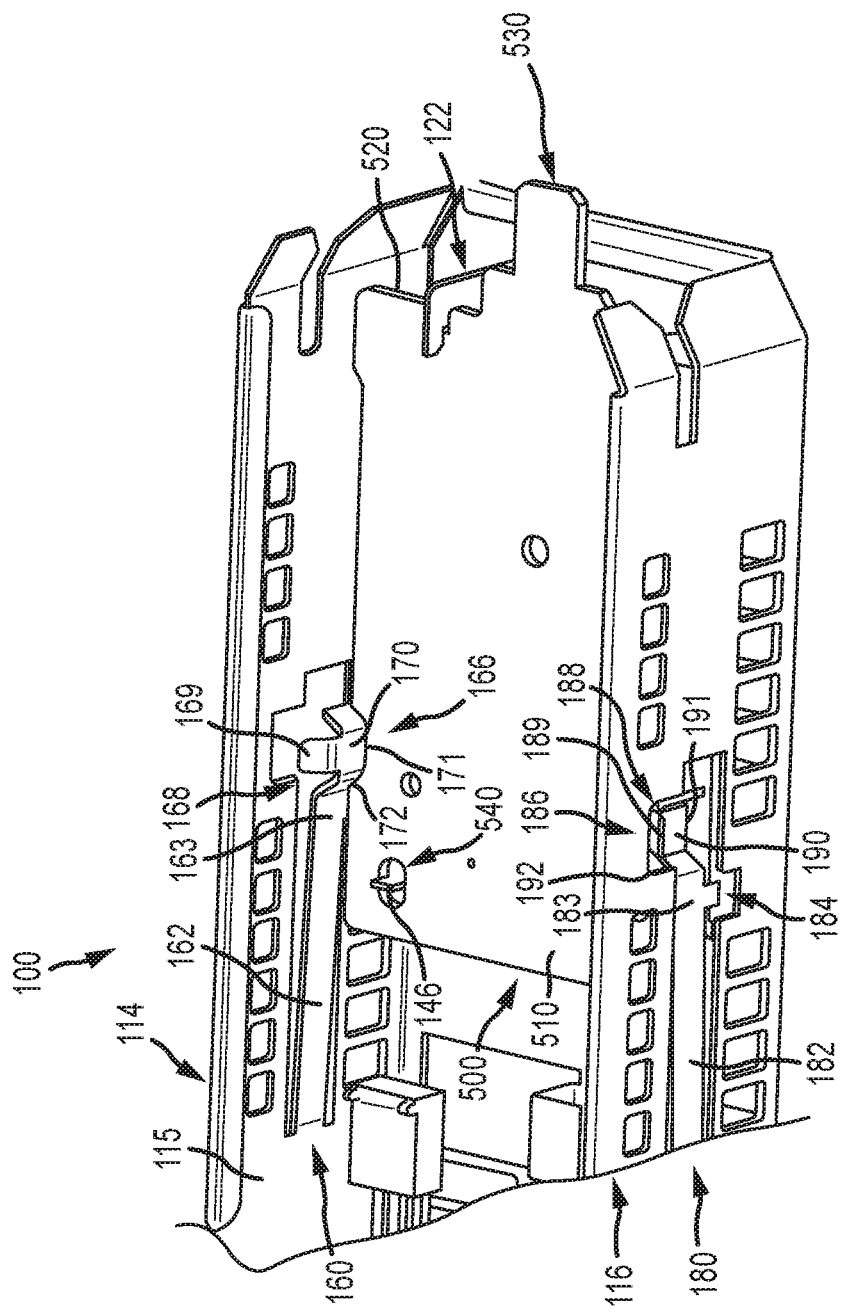
FIG. 8 is a top perspective view of the enclosure of FIGS. 5-7 after the circuit board has been pushed down further from the initial position of FIGS. 5-7 to cause the mounting assembly to locate and fasten the circuit board into place within the enclosure.

FIGS. 8-11 illustrate the enclosure 100 after the installation of the board 500 in the mounting assembly 120 has been completed. Specifically, FIGS. 8-11 illustrate the enclosure after a technician has applied a downward force on the board 500 in the position shown in FIGS. 5-7 (e.g., on the upper surface 510 of the board 500 toward the trailing edge such as between the two locating holes 540, 550). As shown in FIG. 8, the application of this downward force has resulted in the board 500 being pushed downward over the two side retention members 160, 180 to be received onto the rear locating members, which is evidenced by the post/tab 146 extending upward through the hole 540 in the board 500. Positioning the post/tab 146 in the hole 540 causes the board 500 to be properly positioned or located relative to the sidewalls 114, 116 or with proper side-to-side alignment in the enclosure 100 and/or with desired positioning relative to the X-axis of the enclosure 100.

Further, as shown in FIG. 8, the retention members 160, 180 (once the board's upper surface 510 moves past the head assembly 166, 186) have each snapped or sprung back from an offset position to its at-rest position. The offset position is not shown in FIGS. 8-11, but the retention members 160, 180 are placed in this position as the board 500 is moved from the configuration of FIGS. 5-7 to the configuration (mounted position) of FIGS. 8-11. Particularly, the lower surface 511 of the board 510 contacts the contact surface 169, 189 of the upper guide tabs 168, 188 of the head assemblies 166, 186, and, due to their outward angled surface (relative to vertical), the applied downward force causes each of the head assemblies 166, 186 to be pushed outward toward and through a hole/gap in the nearby or adjacent sidewalls 114, 116. The lever arms 162, 182 are elastically bent or deformed outward during this operation to allow the displacement of the head assemblies 166, 186 including the bodies 170, 190 to the offset position. Once this offset position is reached by the bodies 170, 190, the board 500 quickly moves (or snaps) downward into the enclosure 100 to be fully seated upon the support or receiving surfaces of the four locating members 122, 132, 140, 150.

Once cleared by the board 500, the side retention members 160, 180 spring back into the illustrated at-rest positions with the bodies 170, 190 overhanging the upper surface 510 of the board along the left and right sides/edges of the board by a predefined overhang/retention distance, $d_1$ (such as 1 to 5 mm or more). The lower contact surfaces 171, 191 contact (or are proximate to) the upper surface 510 of the board 500 to fasten or lock the board 500 in place in the mounting assembly 120 and enclosure 100 and/or to avoid lift off from the locating members' receiving/supporting surfaces. The lower posts/tabs 164, 184 extending from the lever arms 162, 182 also abut or are proximate to the sides/edges of the board 500 so as to apply retention forces inward into the enclosure to limit and/or even prevent side-to-side movement (movement along the X-axis) of the board 500.

Figure 9:
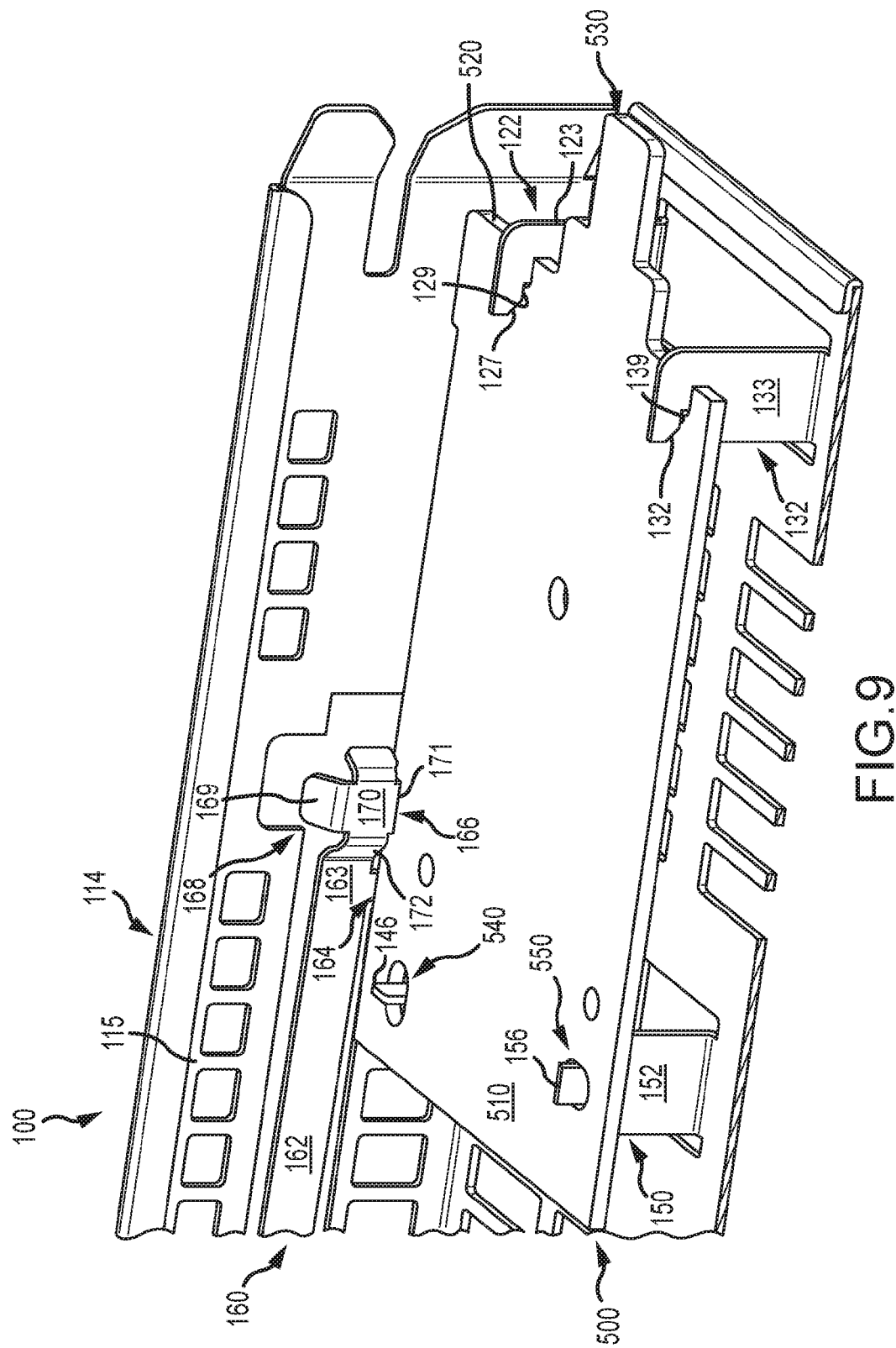
FIG. 9 is a view similar to that shown in FIG. 8 but with the right sidewall of the enclosure removed to show more details of the mounting assembly and its interaction with the received/installed circuit board.

FIG. 9 shows the enclosure 100 of FIG. 8 with the right sidewall 116 removed. FIG. 9 is useful for showing that the board's leading edge 520 has been fully seated into the grooves/slots 124, 134 of the bodies 123, 133 of the forward locating members 122, 132. This acts, in part, to provide accurate locating along the Z-axis of the board 500 and its edge connector 530 and also to provide accurate locating along the Y-axis (or vertical positioning in the enclosure 100) as the bottom surface/side 511 of the board 500 is supported by the support surfaces 126, 136 of slots 124, 134. The upper retention surfaces 129, 139 of the slots 124, 134 act to prevent the leading or front edge 520 of the board from lifting off the bodies 123, 133 of the locating members 122, 132 (limit movement along the Y-axis). FIG. 9 also shows that rear locating member 150 is acting to provide locating or alignment of the board 500 along the Z-axis of the enclosure 100 as the tab/post 156 is received in and extends through the hole 550. The two posts/tabs 146, 156 are sized to have a length that matches the length of the holes 540, 550 (or is smaller than this length by a predefined tolerance) to provide the desired locating function and to limit movement of the mounted board 500 along the X and Y axes.

Figure 10:
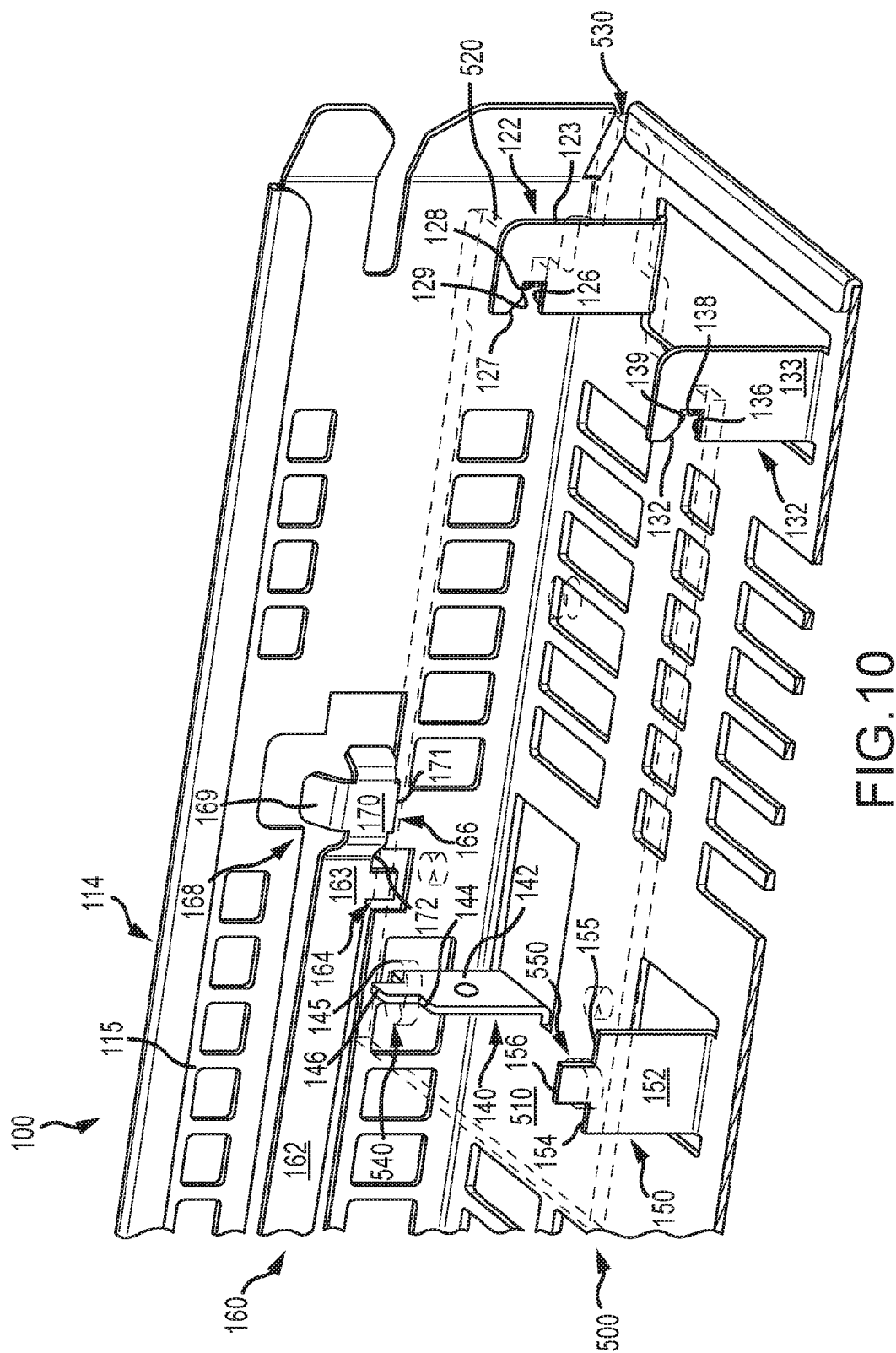
FIG. 10 is a view similar to that of FIG. 9 but with the circuit board shown as transparent (with dashed lines) to better illustrate the mating of the circuit board with components of the mounting assembly.

FIG. 10 illustrates the enclosure of FIG. 9 but with the mounted/installed board 500 shown to be transparent to show additional details of the mounting assembly 120. Particularly, FIG. 10 is useful for showing that the leading edge of the board 520 abuts the forward stop surface 128, 138 of the slots 124, 134 in the forward locating members 122, 132 and also the lower surface 511 of the board 510 is resting upon or contacting the lower receiving/support surfaces 126, 136 of the locating members 122, 132. FIG. 10 also better illustrates that, with the tabs/posts 146, 156 in the board's locating holes 540, 550, respectfully, and the retention members 160, 180 pressing downward on the board's upper surface 510, the board's lower surface 511 is contacting the left and right rear locating members 140, 150. Specifically, the board 500 is supported and located vertically or along the Y-axis by the shoulders 144, 145 of member 140 and by the shoulders 154, 155 of member 150.

Figure 11:
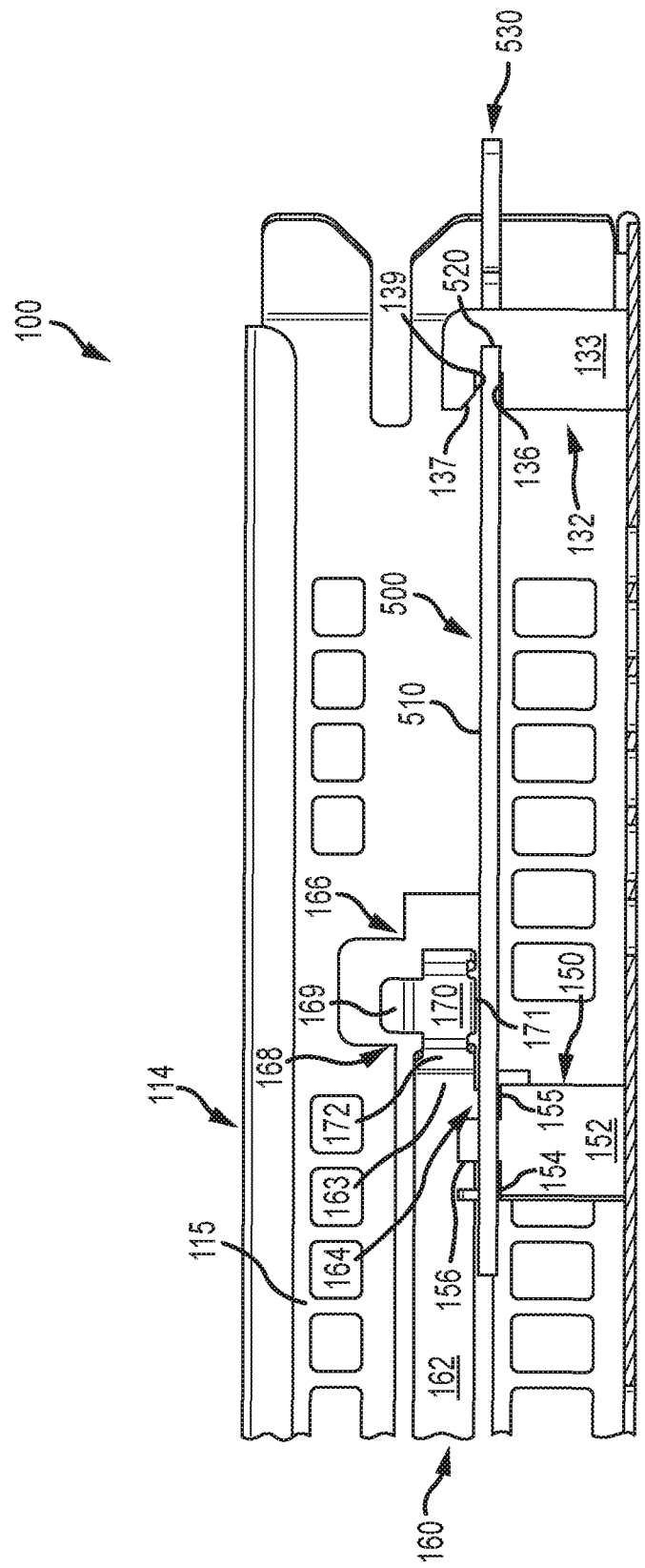
FIG. 11 is a side view of the enclosure of FIG. 9.

FIG. 11 illustrates the enclosure of FIG. 9 with a side view, and FIG. 11 is useful for further illustrating the particular physical relationships of the mounting assembly 120 and its components with a mounted or received board. FIG. 11 illustrates that in this example the board 500 is supported by the mounting assembly 120 to be horizontal and parallel to the base 110 of the enclosure 100, with the Y-axis location set by the heights of the shoulders 154, 155 and receiving/support surface 136. FIG. 11 also makes it clear that the board 500 is supported by the mounting assembly 120 so as to locate/position the edge connector relative to a front edge/end of base 110 and sidewalls 114, 116 and to extend outward a distance to allow it to be mated with another board's connector. As shown, it can also be seen that the retention surface 171 of the head assembly's body 170 on left side retention member 160 abuts/contacts (or is only slightly spaced apart) the upper surface 510 of the board 500 to lock the board 500 in place within the mounting assembly 120. In this position, the board's Z-axis location is set by the tab/post 156 extending through the board 500 and also by the forward stop 138 in the slot 134 of the forward locating member 132. Once installed, the board 500 can also be easily removed by a technician applying pressure on the bodies 170, 190 of the head assemblies 166, 186 of the two side retention members 160, 180 to move these into the offset or dislocated positions and then lifting up on the rear/inward end of the board.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The enclosure may be fabricated to include an integral mounting assembly (or portions of such a mounting assembly). To this end, the enclosure and mounting assembly may be fabricated from sheet metal with the locating members and retention members cut or punched out of the base and sidewalls of the enclosure. However, the mounting assembly design may also be implemented using different materials. With the sheet metal implementation, the locating members (or front and rear base members) may be formed by punching out their outer edges and bending their bodies to be orthogonal to the base, and the side retention members may likewise be formed by punching out their bodies and bending then forming the head to extend outward a predefined distance (retention overhang distance or the like) from the inner surface of the enclosure sidewalls. The locating members on the enclosure base raise the board a distance from the inner surface of the base and act to locate the board within the enclosure interior space. The retention members on the sidewalls of the enclosure allow the board to be snapped into place within the enclosure without any tools. Once the side retention members or elements pop or spring back over the board (back into their at-rest positions with the head spaced apart a distance from the inner surface of the nearby sidewall), the board is securely mounted in the enclosure.

We claim:

1. A computer enclosure adapted for tool-less installation of a circuit board, comprising:
  a base;
  a first sidewall extending outward from an upper surface of the base;
  a second sidewall extending outward from the upper surface of the base and spaced apart from and parallel to the first sidewall, wherein inner surfaces of the first and second sidewalls with the upper surface of the base define an interior space of the computer enclosure;
  a forward locating member comprising a body extending into the interior space from the upper surface of the base, wherein the forward locating member includes a guide slot in the body facing the interior space with a lower receiving surface parallel to the upper surface of the base and a forward stop surface, wherein, when a leading edge of a circuit board is inserted into the guide slot, the leading edge of the circuit board abuts the forward stop surface to define a location of the leading edge relative to a longitudinal axis of the computer enclosure and a bottom surface of the circuit board abuts the lower receiving surface to support the circuit board a predefined height above the upper surface of the base;
  a rear locating member spaced apart from the forward locating member and including a body extending into the interior space from the upper surface of the base, wherein the rear locating member includes a tab extending from the body and separating a pair of shoulder surfaces on the body, wherein, when the circuit board is installed in the computer enclosure, the tab extends through a hole in the circuit board defining a location of the circuit board relative to the inner surfaces of the first and second sidewalls and limiting side-to-side movement of the circuit board relative to the first and second sidewalls, and further wherein, when the circuit board is installed in the computer enclosure, the bottom surface of the circuit board abuts the shoulder surfaces to support the circuit board at the predefined height above the upper surface of the base; and first and second side retention members provided on the inner surfaces of the first and second sidewalls, respectfully, wherein each of the first and second side retention members includes a head assembly supported on a lever arm, wherein the head assembly includes a body with an at-rest position an overhang distance from the inner surface of the sidewall and an offset position proximate to the inner surface of the sidewall, and wherein, during insertion of the circuit board, the body of the head assembly is moved from the at-rest position to the offset position to position the bottom surface of the circuit board on the shoulders of the body of the rear locating member and, after positioning of the circuit board on the rear locating member, the body of the head assembly springs back to the at-rest position with a contact surface of the body of the head assembly extending over an upper surface of the circuit board.

2. The computer enclosure of claim 1, wherein the head assembly of each of the first and second side retention members further includes an upper guide tab extending outward from a side of the body opposite the base and wherein the upper guide tab is angled away from the body toward the inner surface of the sidewall at an angle in the range of 30 to 60 degrees.

3. The computer enclosure of claim 2, wherein the overhang distance is at least 3 millimeters.

4. The computer enclosure of claim 1, wherein the guide slot in the forward locating member includes an upper retention surface extending from the forward stop surface and a guide surface extending from the upper retention surface to an opening of the guide slot, wherein the upper retention surface, when the circuit board is positioned with the lead edge in the guide slot, limits movement of the circuit board in a direction away from the base, and wherein the guide surface is angled away from the lower receiving surface at an angle of at least 30 degrees.

5. The computer enclosure of claim 1, further including an additional forward locating member spaced apart from the forward locating member and comprising a body extending into the interior space from the upper surface of the base, wherein the additional forward locating member includes a guide slot in the body facing the interior space with a lower receiving surface parallel to the upper surface of the base and a forward stop surface, wherein, when the leading edge of a circuit board is inserted into the guide slot, the leading edge of the circuit board abuts the forward stop surface to define the location of the leading edge relative to the longitudinal axis of the computer enclosure and the bottom surface of the circuit board abuts the lower receiving surface to support the circuit board at the predefined height above the upper surface of the base.

6. The computer enclosure of claim 1, further including an additional rear locating member spaced apart from the rear locating member and including a body extending into the interior space from the upper surface of the base, wherein the additional rear locating member includes a tab extending from the body and separating a pair of shoulder surfaces on the body, wherein, when the circuit board is installed in the computer enclosure, the tab extends through an additional hole in the circuit board defining a location of the circuit board relative the longitudinal axis of the computer enclosure and limiting movement of the circuit board relative to the longitudinal axis of the computer enclosure, and further wherein, when the circuit board is installed in the computer enclosure, the bottom surface of the circuit board abuts the shoulder surfaces to support the circuit board at the predefined height above the upper surface of the base.

7. The computer enclosure of claim 1, wherein the base and the first and second sidewalls are fabricated of sheet metal, wherein the front and rear locating members are integrally formed with the base, and wherein the first and second side retention members are integrally formed from the first and second sidewalls, respectfully, with an end of the lever arm joined to a corresponding one of the first and second sidewalls.

8. A computer enclosure adapted for tool-less installation of a circuit board, comprising:

a base;

a first sidewall extending outward from an upper surface of the base;

a second sidewall extending outward from the upper surface of the base and spaced apart from and parallel to the first sidewall, wherein inner surfaces of the first and second sidewall with the upper surface of the base define an interior space of the computer enclosure;

a pair of spaced-apart forward locating members each comprising a body extending into the interior space from the upper surface of the base, wherein the body includes a guide slot receiving, during insertion of a circuit board, a leading edge of the circuit board and defining a location of the leading edge relative to a Z-axis of the computer enclosure and wherein the guide slot includes a lower receiving surface to support the circuit board at a predefined location relative to a Y-axis of the computer enclosure;

first and second rear locating members each including a body extending into the interior space from the upper surface of the base, wherein each of the first and second rear locating members includes a tab extending from the body and at least one upper support surface, wherein, when the circuit board is installed in the computer enclosure, the tab of the first rear locating member extends through a first hole in the circuit board to establish a location of the circuit board relative to the X-axis of the computer enclosure and the tab of the second rear locating member extends through a second hole in the circuit board to establish a location of the circuit board relative to the Z-axis of the computer enclosure, and further wherein, when the circuit board is installed in the computer enclosure, the circuit board abuts the support surfaces on the bodies of the first and second rear locating members to support the circuit board at the predefined location relative to the Y-axis of the computer enclosure; and first and second side retention members provided on the inner surfaces of the first and second sidewalls positionable between an at-rest position and an offset position, wherein, when the circuit board is installed in the computer enclosure, the first and second side retention members limit movement of the circuit board away from the first and second rear locating members along the Y-axis.

9. The computer enclosure of claim 8, wherein each of the first and second side retention members includes a head assembly supported on a lever arm, wherein the head assembly includes a body, when in the at-rest position, at an overhang distance from the inner surface of the sidewall and, when in the offset position, proximate to the inner surface of the sidewall, wherein, during insertion of the circuit board, the body of the head assembly is moved from the at-rest position to the offset position to position the bottom surface of the circuit board on the shoulders of the body of the rear locating member and, after positioning of the circuit board on the rear locating member, the body of the head assembly springs back to the at-rest position with a contact surface of the body of the head assembly extending over an upper surface of the circuit board, and wherein the head assembly of each of the first and second side retention members further includes an upper guide tab extending outward from a side of the body opposite the base that is angled away from the body toward the inner surface of the sidewall at an angle in the range of 30 to 60 degrees.

10. The computer enclosure of claim 8, wherein the guide slot in the forward locating member includes an upper retention surface extending from the forward stop surface and a guide surface extending from the upper retention surface to an opening of the guide slot, wherein the upper retention surface, when the circuit board is positioned with the lead edge in the guide slot, limits movement of the circuit board in a direction away from the base, and wherein the guide surface is angled away from the lower receiving surface at an angle of at least 30 degrees.

11. The computer enclosure of claim 8, wherein the base and the first and second sidewalls are fabricated of sheet metal, wherein the front and rear locating members are integrally formed with the base, and wherein the first and second side retention members are integrally formed from the first and second sidewalls, respectfully, with an end of the lever arm joined to a corresponding one of the first and second sidewalls.

12. A computer enclosure adapted for tool-less installation of a circuit board, comprising:
a base;
a first sidewall extending outward from an upper surface of the base;
a second sidewall extending outward from the upper surface of the base and spaced apart from and parallel to the first sidewall, wherein inner surfaces of the first and second sidewall with the upper surface of the base define an interior space of the computer enclosure;
a rear locating member spaced apart from the forward locating member and including a body extending into the interior space from the upper surface of the base, wherein the rear locating member includes a tab extending from the body and separating a pair of shoulder surfaces on the body, wherein, when the circuit board is installed in the computer enclosure, the tab extends through a hole in the circuit board defining a location of the circuit board relative to the inner surfaces of the first and second sidewalls and limiting side-to-side movement of the circuit board relative to the first and second sidewalls, and further wherein, when the circuit board is installed in the computer enclosure, the bottom surface of the circuit board abuts the shoulder surfaces to support the circuit board at a predefined height above the upper surface of the base; and
first and second side retention members provided on the inner surfaces of the first and second sidewalls, respectfully, that are adapted to limit movement of the circuit board away from the rear locating member.

13. The computer enclosure of claim 12, wherein each of the first and second side retention members includes a head assembly supported on a lever arm, wherein the head assembly includes a body with an at-rest position an overhang distance from the inner surface of the sidewall and an offset position proximate to the inner surface of the sidewall, and wherein, during insertion of the circuit board, the body of the head assembly is moved from the at-rest position to the offset position to position the bottom surface of the circuit board on the shoulders of the body of the rear locating member and, after positioning of the circuit board on the rear locating member, the body of the head assembly springs back to the at-rest position with a contact surface of the body of the head assembly extending over an upper surface of the circuit board.

14. The computer enclosure of claim 13, wherein the head assembly of each of the first and second side retention members further includes an upper guide tab extending outward from a side of the body opposite the base and wherein the upper guide tab is angled away from the body toward the inner surface of the sidewall at an angle in the range of 30 to 60 degrees.

15. The computer enclosure of claim 14, wherein the overhang distance is at least 3 millimeters.

16. The computer enclosure of claim 12, further including a forward locating member comprising a body extending into the interior space from the upper surface of the base, wherein the forward locating member includes a guide slot in the body facing the interior space with a lower receiving surface parallel to the upper surface of the base and a forward stop surface, wherein, when a leading edge of a circuit board is inserted into the guide slot, the leading edge of the circuit board abuts the forward stop surface to define a location of the leading edge relative to a longitudinal axis of the computer enclosure and a bottom surface of the circuit board abuts the lower receiving surface to support the circuit board at the predefined height above the upper surface of the base.

17. The computer enclosure of claim 12, wherein the guide slot in the forward locating member includes an upper retention surface extending from the forward stop surface and a guide surface extending from the upper retention surface to an opening of the guide slot, wherein the upper retention surface, when the circuit board is positioned with the lead edge in the guide slot, limits movement of the circuit board in a direction away from the base, and wherein the guide surface is angled away from the lower receiving surface at an angle of at least 30 degrees.

18. The computer enclosure of claim 12, further including an additional forward locating member spaced apart from the forward locating member and comprising a body extending into the interior space from the upper surface of the base, wherein the additional forward locating member includes a guide slot in the body facing the interior space with a lower receiving surface parallel to the upper surface of the base and a forward stop surface, wherein, when the leading edge of a circuit board is inserted into the guide slot, the leading edge of the circuit board abuts the forward stop surface to define the location of the leading edge relative to the longitudinal axis of the computer enclosure and the bottom surface of the circuit board abuts the lower receiving surface to support the circuit board at the predefined height above the upper surface of the base.

19. The computer enclosure of claim 12, further including an additional rear locating member spaced apart from the rear locating member and including a body extending into the interior space from the upper surface of the base, wherein the additional rear locating member includes a tab extending from the body and separating a pair of shoulder surfaces on the body, wherein, when the circuit board is installed in the computer enclosure, the tab extends through an additional hole in the circuit board defining a location of the circuit board relative the longitudinal axis of the computer enclosure and limiting movement of the circuit board relative to the longitudinal axis of the computer enclosure, and further wherein, when the circuit board is installed in the computer enclosure, the bottom surface of the circuit board abuts the shoulder surfaces to support the circuit board at the predefined height above the upper surface of the base.

20. The computer enclosure of claim 12, wherein the base and the first and second sidewalls are fabricated of sheet metal, wherein the front and rear locating members are integrally formed with the base, and wherein the first and second side retention members are integrally formed from the first and second sidewalls, respectfully, with an end of the lever arm joined to a corresponding one of the first and second sidewalls.

\* \* \* \* \*

UNITED STATES PATENT AND TRADEMARK OFFICE
CERTIFICATE OF CORRECTION

PATENT NO. : 9,965,001 B1  
APPLICATION NO. : 15/431356  
DATED : May 8, 2018  
INVENTOR(S) : Stetor et al.

Page 1 of 1

It is certified that error appears in the above-identified patent and that said Letters Patent is hereby corrected as shown below:

On the Title Page

Item (*) Notice, Line 3, delete "days. days." and insert -- days. --, therefor.

In the Specification

In Column 11, Line 33, delete "100 (" and insert -- 100, --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*